Figure 1B:
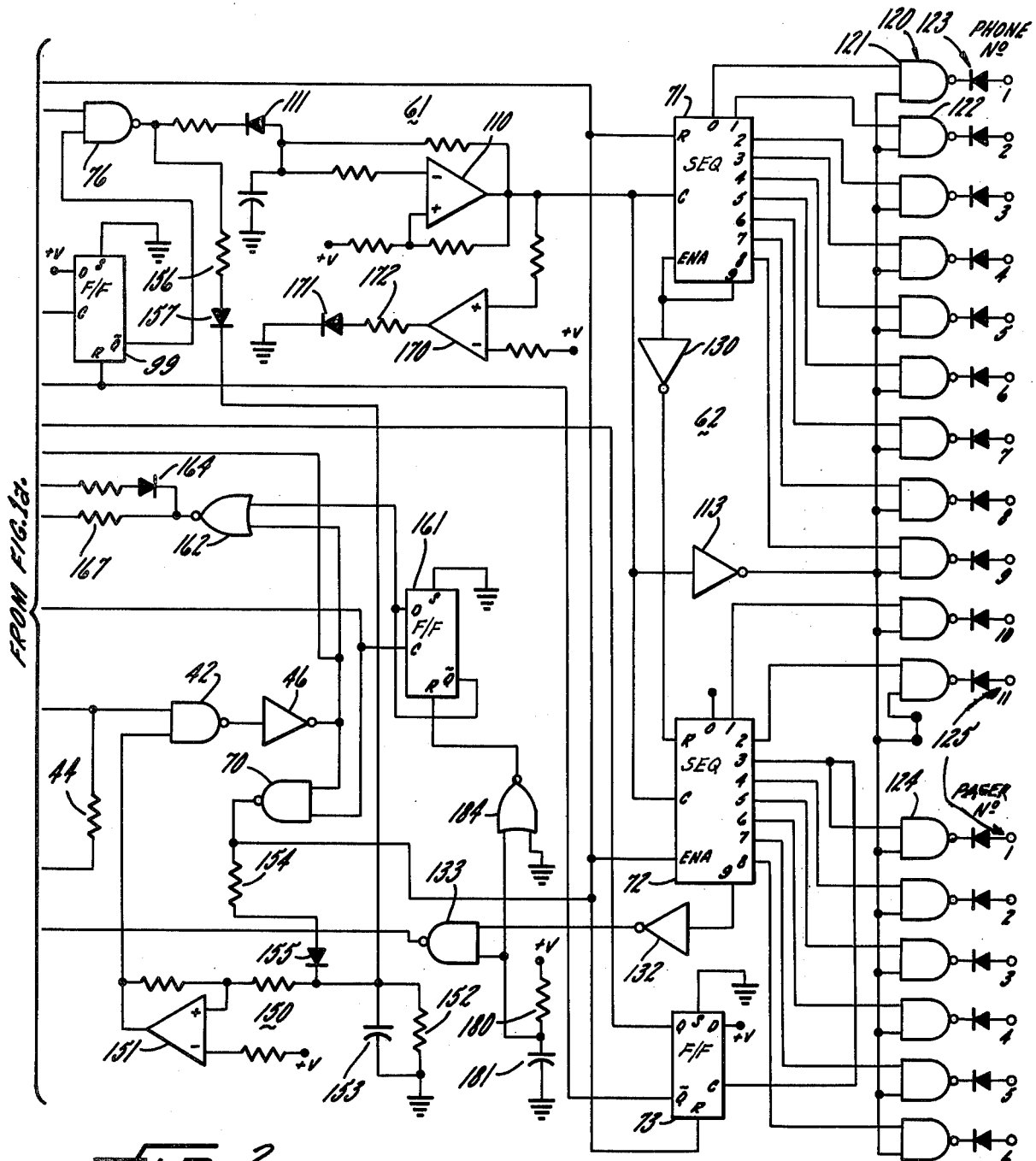

United States Patent [19]

Phillips

[11] 4,072,824

[45] Feb. 7, 1978

[54] AUTOMATIC DIALER FOR PAGING SYSTEM OR THE LIKE

[75] Inventor: Robert C. Phillips, Chicago, Ill.

[73] Assignee: Gimix, Inc., Chicago, Ill.

[21] Appl. No.: 680,200

[22] Filed: Apr. 26, 1976

[51] Int. Cl.² .............................................. H04M 3/42
[52] U.S. Cl. ................................ 179/18 B; 179/90 B; 179/2 A
[58] Field of Search ........... 179/90 B, 90 BB, 90 BD, 179/2 CA, 2 DP

[56] References Cited

U.S. PATENT DOCUMENTS 3,987,246  10/1976  Willis .................................. 179/2 A

*Primary Examiner*—William C. Cooper
*Attorney, Agent, or Firm*—Leydig, Voit, Osann, Mayer & Holt, Ltd.

[57] ABSTRACT

An automatic dialer adapted to efficiently blend the capabilities of an automatic answering machine and a central paging system wherein the automatic dialer detects messages left with the answering machine and in response thereto dials the central paging system, gains access thereto, dials the pre-programmed number of a pager, causing the central paging system to immediately page the user. The automatic dialer page assures that the proper information is conveyed to the central paging system, continuing to recycle internal calling circuitry until the call has been properly completed.

40 Claims, 3 Drawing Figures

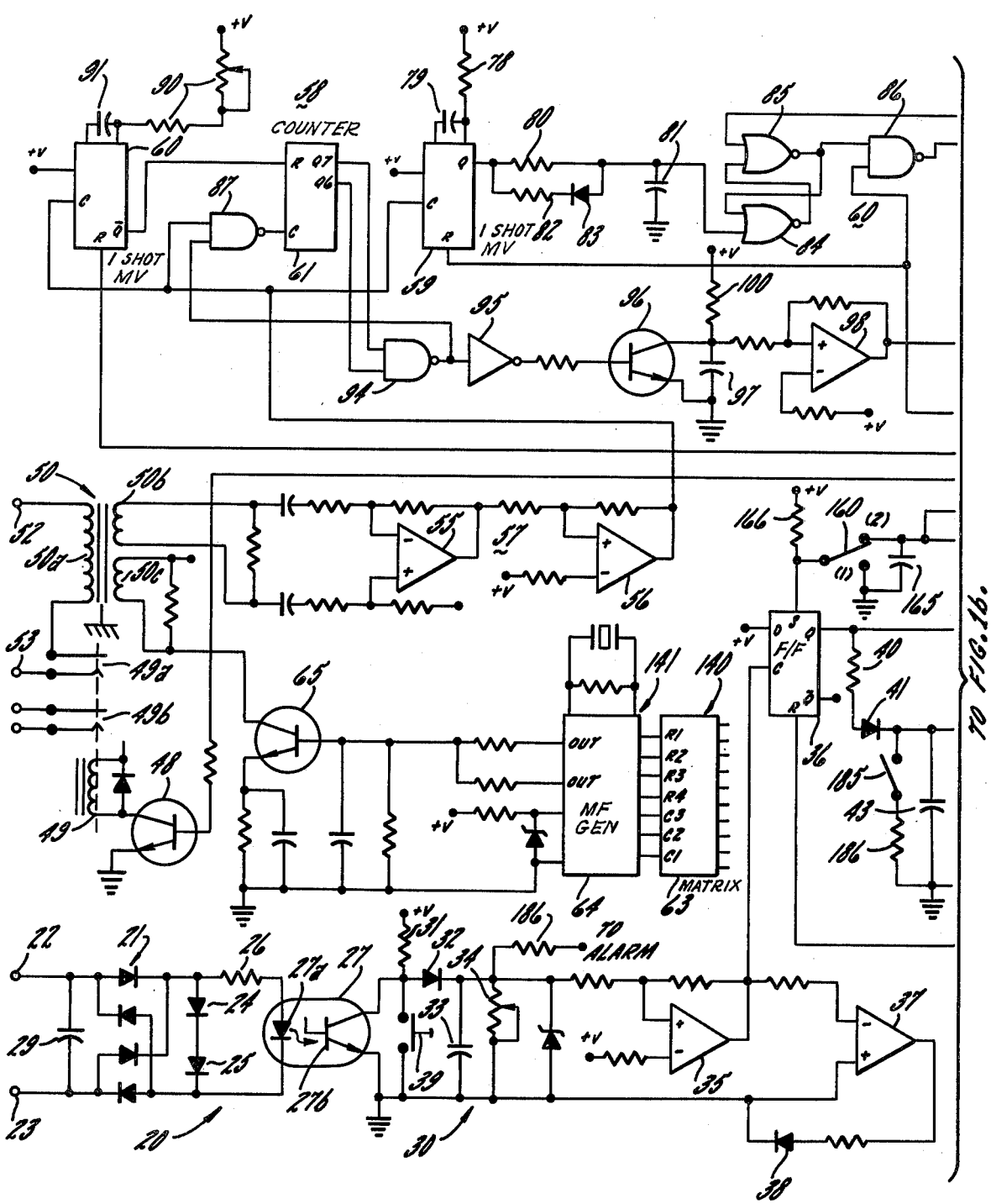

AUTOMATIC DIALER FOR PAGING SYSTEM OR THE LIKE

This invention relates to telephony, and more particularly to an automatic dialer (sometimes referred to hereinafter as an automatic page) for responding to a predetermined signal or condition by dialing the telephone number of a distant station, and upon gaining access thereto for dialing an information bearing number for communication to the distant station.

In its most typical application, the invention is embodied in an automatic page which monitors the telephone line connected to an automatic answering machine, and in response to receipt of a message, automatically dials the pre-programmed number of a central paging system; after gaining access to the central system, the page dials a pre-programmed pager number to cause the central system to activate the user's paging device.

Both the automatic answering machines and the central paging systems with which the instant automatic page is used are known. The automatic answering machine is typically a tape recording device, coupled to a conventional telephone line, for responding to a ringing signal by connecting the recorder to the line to answer an incoming call. Upon connection, a recorded message is played indicating that the call is being machine answered and that the caller may record a message, if desired. Following an appropriate signal to the caller, the machine goes into a record mode whereupon the message of the caller is recorded for later playback. Very often, the machines are configured to respond to a characteristic signal imposed on the line by the user, allowing him to telephone the automatic answering machine and command it to play back messages previously recorded, if any. Thus the user may gain access to his recorded messages from a distant location. However, the problem exists of knowing when a message has been recorded.

Central paging systems, as indicated above, are also known. These systems, generally operated by a paging computer, are accessed by telephone, the computer being adapted to answer telephone calls placed thereto, and after answering a call to receive digits corresponding to one fo the pagers in the system. In order to cause a party to be paged, one simply dials the telephone number of the central system, and, after gaining access, dials the digits assigned to the particular pager. The computer, having received the pager number, actuates a radio transmitter to broadcast a signal modulated with the digits assigned to the pager, such signal being received by a user carried receiver, energizing the same to emit a tone or the like indicating that the user is being paged. The user then responds in a predetermined way, typically by telephoning his office or other prearranged location to determine the reason for the page.

It has also been suggested to modify an automatic answering machine to respond to a message left, by seizing a telephone line, dialing a telephone number, such as that of a central paging computer, and dialing the code number assigned to a particular page. While this system seems to satisfy the need for coupling the answering machine system and the central paging system in a logical manner, it is not without its drawbacks in accomplishing that task. Basically, little assurance is given that the call to the central paging system actually goes through, so that the system may, in certain circumstances, fail to actually generate a page in response to a left message.

In another area, the security industry has developed various configurations of digital dialers or digital communicators for communicating between remote and central stations. By virtue of the fact that the remote and central equipment is designed to be compatible, often being produced by the same manufacturer, the systems may interact and exchange messages to assure that the information is actually communicated. But in the context of an automatic page, because the central paging systems are in existence, and are basically designed to communicate with people rather than machines, the automatic page cannot impose restrictions on the various central paging systems, but rather must communicate according to the various requirements thereof. Lack of standardization in central paging systems across the country further aggravates this problem.

In view of the foregoing, it is a general object of the present invention to provide an automatic page, efficiently blending the capabilities of an automatic answering machine and a central paging system, and so constructed and arranged as to assure that any telephone call made to the central paging system actually goes through. Further in that regard, it is an object to provide such an automatic page for communicating with central paging systems basically configured to receive calls from people rather than machines. An additional objective is to provide such an automatic page having sufficient flexibility to be operationally compatible with central paging systems of numerous types. Even more specifically, it is an object to respond to status signals on the telephone line for tailoring the operating cycle of the automatic page in response to those signals to assure that the call is properly completed.

According to another aspect of the invention, it is an object to provide a universal automatic page, capable of operation with numerous types of answering machines, and requiring no connections to the internal circuitry of such machines. More specifically, it is an object to provide such an automatic page having a sensor responsive to d.c. conditions on the telephone line to which the answering machine is connected for detecting the idle/busy status of such machine.

A detailed object according to the present invention is to provide an automatic page including a highly discriminative filter responsive to signals on the telephone line after such line is seized for detecting dial tone as a prerequisite to initiating a dialing cycle, and for detecting a responsive signal from the central paging system before resuming the dialing cycle. Further in that regard, an object is to provide a maximum cycle timer adapted to abort a dialing cycle is such cycle is not completed during a pre-established period, and to initiate a new dialing cycle, such operation continuing until the call actually goes through.

According to an even broader aspect of the invention, it is an objective to provide an automatic page, responsive to a predetermined signal for seizing a telephone line, dialing a pre-programmed telephone number of a central paging system, and upon gaining access thereto for dialing a further pre-programmed pager number for communication to the central system, such operation being controlled in response to status signals on the line in such a manner as to assure that the call is actually completed.

Figure 2:
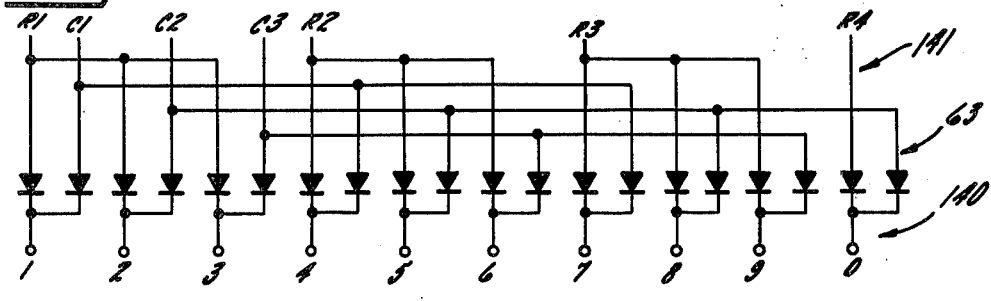

Other objects and advantages will become apparent from the following detailed description when taken in conjunction with the drawings in which:

FIGS. 1a and 1b when joined form a schematic diagram of an automatic page exemplifying the present invention, and FIG. 2 shows a decoding matrix, the inputs of which are connected to outputs of the dialing sequence circuitry for programming the particular digits to be dialed.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Turning now to the drawings, FIGS. 1a and 1b show an automatic page including sensing circuitry, generally indicated at 20, for monitoring the status of a telephone line to which an automatic answering machine (not shown) is connected, and specifically to sense the idle or busy condition of the automatic answering machine. The sensing circuit 20 includes a full wave bridge 21 to assure that voltage of the proper polarity is applied to the sensing elements irrespective of the polarity imposed on the line. The illustrated circuitry may be considered a series sensing circuit, and is adapted to be interposed between one of the conductors of the telephone line and an input conductor of the automatic answering machine, terminals 22, 23 being provided for this purpose. For example, terminal 22 may be connected to one of the conductors of the telephone line, terminal 23 to an input terminal of the answering machine and the other conductor of the telephone line directly to the answering machine so that all of the current drawn from the line by the machine flows through the sensing circuit. A pair of serially coupled diodes 24, 25 are connected across the bridge 21 so that current flow through the sensing circuit between the telephone line and answering machine produces a maximum voltage drop of only a few volts. However, the voltage drop across diodes 24, 25 allows sufficient current flow to optical coupling means 27 for sensing the line condition, such optical coupling means including photo-emissive means shown herein as LED 27a and photo-responsive means shown herein as phototransistor 27b. In short, when the answering machine is in the idle or on hook condition, current flow from the telephone line to the answering machine is at a minimum, insufficient to illuminate the LED 27a, and keeping the phototransistor 27b off. But when the answering machine is busy, that is engaged in receipt of a telephone call, current flow through the sensing circuit is at a maximum, the portion shunted through resistor 26 and LED 27a causing the LED to be illuminated, thereby switching the phototransistor 27b on. For passing ringing current around the sensing circuit, a capacitor 29 is connected directly across the bridge 21.

It should be noted at this point that while the illustrated sensing circuit is preferred, alternative means may be provided responsive to the d.c. condition of the telephone line for detecting the busy/idle status of the answering machine. For example, a parallel sensing circuit may be provided having a Zener diode serially connected with the LED of an optical coupler, the Zener diode having a breakover level higher than the voltage drop across the line in the busy condition, but lower than the voltage drop in the idle condition. In this case, the series circuit is connected across the telephone line so that the LED will be illuminated whenever the answering machine is on hook and will be extinguished when the answering machine goes off hook. However, the parallel line sensing circuit suffers from the disadvantage of drawing line current (although minimal) whenever the answering machine is idle. Both the series and parallel circuits are, however, workable, and both effectively respond to d.c. conditions in the loop connected to the answering machine for detecting the idle/busy status of such machine. It is emphasized that by virtue of the sensing circuit arranged to sense the line conditions as an indication of the status of the answering machine, no internal connections need be made to the answering machine, making the automatic page truly universal.

According to one feature of the illustrated embodiment, means are provided for timing the busy periods of the answering machine and initiating an automatic calling cycle whenever the length of the busy period exceeds a predetermined threshold. To that end, a timing circuit generally indicated at 30 is connected to the sensing circuit, and specifically to phototransistor 27b. When the transistor 27b is off, (answering machine idle) current flow through resistor 31 and diode 32 charges capacitor 33 to substantially the full voltage of the power supply. However, when the answering machine responds to a telephone call, thereby assuming the busy condition, the phototransistor 27b becomes conductive, reverse biasing the diode 32, and allowing the capacitor 33 to discharge through an adjustable potentiometer 34. A level detector comprising amplifier 35 and its related components is connected to the capacitor 33 for responding to the voltage level thereon. Whenever the capacitor is in its fully charged state, the output of amplifier 35 will be at a high level, but as the capacitor discharges through the resistor 34, the decreasing voltage level ultimately causes the level detector 35 to drive its output low.

It is seen that the output of amplifer 35 is connected to the trigger input of a flip-flop 36, to provide an activating signal thereto, the flip-flop being constructed to trigger on the rising edge of a clock signal. Thus, when the timer 30 times out, driving the output of amplifier 35 low, the circuit is armed for subsequent triggering of the flip-flop. Upon return of the answering machine to the idle condition, the phototransistor 27b becomes non-conductive, allowing the capacitor 33 to begin to recharge through resistor 31 and diode 32. The voltage on the capacitor 33 increases, ultimately causing the level detector 35 to return its output high. This action triggers the flip-flop 36 to initiate an automatic calling cycle. The hysteresis associated with level detector 35 produces a delay of about 1.5 seconds between return of the answering machine to the idle condition and production of the activating signal.

For providing an indication of the response of the sensing circuit, a message left indicating circuit including amplifier 37 and light emitting diode 38 is connected to the output of the amplifier 35. When the output of the amplifier 35 switches low, as a result of the answering machine being engaged for a time exceeding the threshold period, the low signal, applied to the inverting input of amplifier 37, causes the output thereof to switch high and provide current flow through the LED 38, illuminating same. When the calling party again hangs up, the output of amplifier 35 switches high after the delay period, returning the amplifier 37 to the output low condition and extinguishing the LED 38. Thus the LED 38 is illuminated when the answering machine is engaged for a time exceeding the preset threshold, and remains illuminated for as long as the line remains engaged.

The potentiometer 34 in the timing circuit 30 allows the length of the period necessary to arm the flip-flop 36 to be adjusted to suit the requirements of the user. Typically, a user does not wish to be paged unless a caller has indeed left a message with the answering machine. Accordingly, the user will adjust the potentiometer 34 to provide a time period having a duration equal to the length of the recorded message played to the caller, plus an additional period for the minimum length of recorded message desired before actuating the system. To facilitate this adjustment, a message left timer test switch 39 is provided, shunted across the transistor 27b. To set up the system, the user depresses the switch 39, which serves to reverse bias the diode 32 and cause the capacitor to discharge, and notes the length of time which elapses until the message left indicator 38 is illuminated. The potentiometer 34 is adjusted to achieve the desired length of time, thereby setting up the system to the particular desires of the user.

As in the case of the sensing circuit, the circuitry for producing the activating signal, although preferred, is not the only means of accomplishing the desired function. More specifically, the illustrated circuit awaits the termination of the incoming call before initiating an automatic dialing sequence. However, in certain circumstances, as will become more apparent, the automatic page is adapted to operate with two telephone lines, one serving as the incoming answering machine line, and the other as the dial out line. In this case, it may be possible to initiate an automatic calling cycle before the incoming call is terminated. However, to allow compatibility with single line use, and to logically await the termination of an incoming message before initiating a page, the illustrated circuit, wherein the calling cycle is not initiated until the termination of an incoming call, is preferred.

In carrying out the invention, means are provided responsive to the above described activating signal for seizing a telephone line. To that end, the flip-flop 36 which has its clock input driven by the output of amplifier 35, has its D input coupled to the positive supply of voltage so that the flip-flop will respond to the rising edge of the clock by driving its Q output from the low to the high condition. This high signal is coupled through resistor 40 and diode 41 to one of the inputs of NAND gate 42. A timing circuit including capacitor 43 and reistor 44 is also connected to this input of the NAND gate. Thus, when the Q output of the flip-flop 36 swings high, the capacitor 43 will rapidly charge through resistor 40 and diode 41, and upon charging to the threshold level of the NAND gate 42, will cause the output thereof to switch low, by virtue of the fact that the second input of the NAND gate 42 is normally maintained in the high condition by circuitry to be described shortly. As will be described below, the timing circuit of capacitor 43 and resistor 44 is provided to hold the line for a predetermined period after completion of a dialing cycle. The output of NAND gate 42, having responded to the signal from the flip-flop 36 by switching low, drives the output of inverter 46 high, such high signals providing base drive to transistor 48, thereby causing current flow through relay coil 49 coupled in the collector circuit of the transistor 48. In response thereto, the contacts 49a close, connecting winding 50a of transformer 50 across output terminals 52, 53.

The terminals 52, 53 provide termination points for the dial out telephone line. When a separate dial out line is used, independent of the incoming line connected through the sensing circuit to the answering machine, such line is connected directly to terminals 52 and 53. However, in single line use, when the same line is used for incoming calls to the answering machine and outgoing calls to the central system, terminal 52 may be connected to terminal 22 of the sensing circuit, and terminal 53 to the telephone line conductor which runs directly to the answering machine. In this latter case, following the termination of an incoming call, the automatic page will seize the very same line for calling the central paging system.

Closing of the contacts 49a connects the winding 50a across the telephone line, and has the same effect as taking an ordinary telephone off hook, being detected by central office equipment to allow the circuit to seize a line for completing a call. Contacts 49b also closed when the relay 49 is energized are provided to be used mainly in pushbutton telephone operations for bell and light control. It will be appreciated that what has been accomplished thus far is the detection of a message left exceeding a predetermined threshold period, production of an activating signal in response thereto, and response to such activating signal be seizing a telephone line.

In accordance with an important aspect of the invention, means are provided for responding to status signals on the seized telephone line, to tailor the calling cycle in response to received signals. The received status signals are, for example, busy signal, dial tone, and responsive signals indicating that the central paging system has answered the call.

In the illustrated embodiment, a digital filter or digital frequency detector (which terms will be used synonymously herein) is provided to detect the nature of the status signals on the line, allowing the sensing circuitry to be configured to respond to the frequency of signals on the line, while being relatively insensitive to the amplitude thereof. To that end, a zero crossing detector 57 including amplifiers 55, 56 is provided to produce a clocking signal indicating the frequency of signals on the line. Amplifier 55 is differentially coupled across winding 50b of transformer 50, such winding serving as the receive signal path from the seized telephone line. The amplifier 55 is biased so that its output in the no signal condition is approximately at the midpoint of the power supply voltage, so that any a.c. signal on the line is amplified by the amplifier 55 causing the output thereof to switch above or below the quiescent state as the input signal crosses the zero reference level. The output of amplifier 55 is coupled to amplifier 56 arranged as a Schmidt trigger adapted to switch its output between high and low states in dependence upon transitions of the output of amplifier 55. The output of amplifier 45 serves as a clocking signal for a digital filter generally indicated at 58.

The illustrated digital filter includes two detecting circuits, a first detecting circuit including retriggerable multivibrator 59 serving to detect dial tone, and a second detecting circuit including retriggerable multivibrator 60 and counter 61 serving to detect the responsive signal from the central paging system.

Generally, the detecting circuitry 58 acts through gating and latching circuitry 60 to control operation of a sequencing clock generally indicated at 61. The clock, in turn, drives sequencing circuitry generally indicated at 62 for sequencing through the digits corresponding to the telephone number of the central system, and later sequencing through the digits assigned to the pager. The outputs of the sequencing circuit 62 are selectively connected to a decoder 63 to pre-program the desired sequence of digits, the outputs of the decoder being connected to a dual tone multi-frequency generator 64, which produces tones corresponding to the pre-programmed digits. These tone signals drive a transistor 65 having transmission winding 50c of transformer 50 connected in the collector circuit therof, so that the tones corresponding to the pre-programmed digits are imposed on the telephone line.

Referring to the circuitry in greater detail, and recalling that production of an energizing signal by the timing circuit served to clock the flip-flop 36 to the Q high condition, it is seen that this high signal coupled to the input of NAND gate 70 in conjunction with the high signal from the inverter 46 causes the output of NAND gate 70 to switch low. This low signal enables the sequencing circuit 62 by removing the reset signal therefrom, and specifically from selectors 71, 72 and dialing delay flip-flop 73 and also arms cross coupled NOR gates 84, 85 by removing the high signal from the input of NOR gate 85. Thus, the sequencing circuit is enabled to sequence through the pre-programmed digits when clock pulses are coupled thereto to cause such sequencing, and the gating circuit 60 is enabled to respond to detected status signals.

The dial tone detector 59 is enabled by virtue of the connection between the reset input of retriggerable multivibrator 59 and the $\overline{Q}$ output of dialing delay flip-flop 73, such flip-flop being in the reset condition during the first portion of a calling cycle. At this time, however, the responsive signal detector is disabled by virtue of the reset signal applied to multivibrator 60 from the Q output of the dialing delay flip-flop 73. Accordingly, the telephone line being seized, and the zero crossing detector 57 responding to the frequency of signals on the line to produce clock pulses, the retriggerable multivibrator 59 is allowed to respond to such clock pulses. Multivibrator 59, being arranged to detect the dial tone signal imposed on the line by the central office equipment, has the period thereof set by proper selection of resistors 78 and capacitor 79 just below the dial tone frequency, for example at about 300 Hz, so that clock signals provided thereto at any frequency above about 300 Hz will switch the Q output high and maintain such Q output in the high condition for so long as the clock remains above 300 Hz. If the clock switches below 300 Hz, the multivibrator 59 will time out, allowing the Q output thereof to fall. A timing circuit, including resistor 80 and capacitor 81, responds to the Q output of multivibrator 59, so that if the Q output is maintained high for a sufficient period (e.g. dial tone continuously sensed for 2 seconds), a high signal will be coupled to the input of NOR gate 84.

A discharge circuit including resistor 82 and diode 83 is connected in parallel with resistor 80 to discharge the capacitor 81 at a rate more rapid than the charging rate whenever the Q output of the retriggerable multivibrator 59 falls, thereby requiring a continuous dial tone for a predetermined period before enablement of the sequencing circuitry. Because the cross coupled NOR gates 84, 85 were armed by removal of the high signal from the input of NOR gate 85, the circuit responds to the high input coupled to NOR gate 84 generated after dial tone is detected for the appropriate period, to drive the output of NOR gate 84 low, returning the output of NOR gate 85 high. This high signal is coupled to the input of a NAND gate 86 whose second input is driven from the $\overline{Q}$ output of sequencing delay flip-flop 73. As that flip-flop is in its reset condition, the $\overline{Q}$ output will be high, and NAND gate 86 will be satisfied upon the switching over of cross coupled NOR gates 84, 85. Accordingly, the NAND gate 86 will produce a low signal at the output thereof, such low signal being coupled to the input of NAND gate 76, driving its output high. This high signal reverse biases diode 111 to enable the clock 61 to initiate sequencing and thereby dialing of the pre-programmed telephone number.

Before considering the clocking and sequencing circuitry in detail, the response signal detecting portion of the status signal sensing circuit 58 will first be examined.

Whereas the dial tone detector multivibrator 59 is adapted to sense clock signals produced by the sensing circuitry after the dial out line is initially seized, the responsive signal detector 60 is enabled only after the pre-programmed telephone number has been dialed, as controlled by the dialing sequence delay flip-flop 73. When the flip-flop 73 is in its normal quiescent condition the multivibrator 60 is disabled while multivibrator 59 is enabled, but after the flip-flop 73 is toggled to its alternate condition (following the dialing of the pre-programmed telephone number, as will shortly become apparent) the multivibrator 60 is enabled while multivibrator 59 is disabled.

Upon being enabled, the responsive signal detecting means, comprising multivibrator 60 and counter 61, responds to clock pulses produced by the zero crossing detector 57, and specifically at the output of amplifier 56. The clock pulses are passed directly to the clock input of the multivibrator 60, and via NAND gate 87 to the clock input of the counter 61. Thus, the counter 61 counts the clock pulses while the multivibrator 60 responds to the frequency thereof. The timing elements of the multivibrator 60 comprising resistors 90 and capacitor 91 are selected so that the frequency of the multivibrator 60 is just below the frequency of the signal to be detected. If a signal above the frequency of the multivibrator 60 is produced at the output of amplifier 56, the multivibrator 60 will be clocked and will maintain the $\overline{Q}$ output thereof low for so long as the signal continues. As the $\overline{Q}$ output is coupled to the reset input of the counter 61, the reset signal from the counter will be removed, and the counter will be allowed to count such clock pulses. However, if the frequency of the clock pulses drops below the period of the multivibrator 60, the $\overline{Q}$ output thereof will return high, resetting the counter 61 and clearing the number of clock pulses counted to that point. The outputs of the counter 61 are monitored, in the instant case the sixth and seventh level outputs, so that when the counter counts a sufficient number of clock pulses, a signal is produced indicating that the responsive signal has been received. In the instant case, 96 cycles of the clock are required in order to produce a signal indicating response by the central system. Thus, if the responsive signal persists at a frequency above that established for multivibrator 60 for a time sufficient to generate 96 clock pulses, the sixth and seventh level outputs of the counter 60 will be switched high, satisfying NAND gate 94, and driving the output thereof low. This low signal is inverted by an inverter 95 thereby providing base drive to a transistor 96, causing such transistor to conduct to discharge a capacitor 97 connected between its emitter and collector. The capacitor is connected to the non-inverting input of a level detecting amplifier 98, the output of such amplifier driving the clock input of flip-flop 99. With the transistor 96 conducting and the capacitor 97 discharged, the clock input of the flip-flop 99 is brought to a low level, thereby arming the flip-flop to respond to a subsequent positive edge for clocking same. When the responsive signal terminates, the multivibrator 60 will be allowed to time out, driving the $\overline{Q}$ output thereof high, and resetting the counter 61. This action brings the outputs of the counter low, driving the output of NAND gate 94 high, the output of inverter 95 low, and removing the source of base drive for transistor 96. The capacitor 97 thereupon begins charging through resistor 100. When the voltage on the capacitor 97 reaches the breakover point of the level detector 98, the output thereof will be switched high, clocking the flip-flop 99 and driving the $\overline{Q}$ output thereof low. Since the $\overline{Q}$ output is coupled to the input of NAND gate 76, the output of NAND gate 76 will be driven high, again allowing the clock circuit 61 to generate pulses to continue the dialing sequence and dial the pre-programmed pager number.

It is presently intended that two options be made available with respect to the responsive signal detecting circuit, such options being dictated by the characteristics of the central paging system with which the automatic page is used. More specifically, the majority of central paging systems impose a "beep tone" on the line, above about 850 Hz, indicating that the system is prepared to receive the digits of the paper to be paged. These systems allow a period of about 5 seconds following the termination of the beep tone during which the pager digits must be entered. The automatic page is made compatible with these systems by selecting resistor 90 and capacitor 91 to set the frequency of multivibrator 60 just below tone frequency, at about 850 Hz. The resistor 100 and capacitor 97 are selected to provide a delay of about 2 seconds between termination of the beep tone and triggering of the flip-flop 99 to resume the dialing cycle. Thus the beep tone must be detected continuously for a time sufficient to satisfy the counter 61 thereby arming the flip-flop 99, and the beep tone must terminate, initiating a built-in delay following which the flip-flop 99 is triggered to resume the dialing cycle.

The second option is usuable with the comparatively few central paging systems which do not provide a responsive signal in the form of a beep tone. These systems simply answer the call and allow a 10 or 15 second period to enter the pager digits. The automatic page is configured to sense a responsive signal from these systems by detecting the ring back signal, being armed thereby, and being triggered by the cessation of ring back, indicating that the central system has answered the call. In this case the frequency establishing components of multivibrator 60, comprising resistors 90 and capacitor 91, are selected to set the frequency of the multivibrator 60 just below the ring back frequency, in some cases as low as 300 Hz. The period of resistor 100 and capacitor 97 is adjusted to be approximately 6 seconds, spanning the dwell periods between ring back signals. More specifically, during the time when the ring back signal is on the line, the multivibrator 60 will remain triggered, allowing the counter 61 to fill and causing the transistor 96 to conduct to discharge capacitor 97. When the ring signal is temporarily interrupted, the multivibrator 60 will time out, resetting the counter 61, and switching the transistor 96 off. However, the delay period associated with resistor 100 and capacitor 97 is set at about 6 seconds so that the level detector 98 will not respond before the initiation of the next cycle of ring back. In order to switch the output of level detector 98 high, the central paging system must indeed answer the telephone, terminating the ring back signal so that capacitor 97 may charge sufficiently to switch the output of level detector 98 high, triggering the flip-flop 99 to resume the dialing cycle. Thus the responsive signal detector is armed by the first ring back signal, spans the dwell period between ring back signals, and is triggered after ring back is terminated by the central system answering the call.

Referring now in more detail to the clock and sequencing circuits, it is seet that the clock circuit 61 includes an amplifier 110 configured as an astable multivibrator. The inverting input of amplifier 110 is connected via diode 111 to the output of NAND gate 76 so that whenever the output of NAND gate 76 is low, the diode 111 is forward biased, preventing the multivibrator 110 from oscillating. However, whenever the output of amplifier 76 switches high, the diode 111 is reverse biased, and the astable 110 is allowed to oscillate.

The output of the amplifier 110 is connected to the clock inputs of sequencing selectors 71, 72 and via an inverter 113 to the enabling inputs of an array of NAND gates collectively indicated at 120. The sequences 71, 72 are commercially available decade counters with internal code converters which respond to clock pulses by individually energizing the 0 through 9 output lines thereof in sequence. As shown in the drawing, the sequencer outputs are connected to associated ones of the NAND gates 120 so as to sequentially satisfy those gates in response to receipt of clock signals. When the automatic page is in its quiescent condition, the sequencers 71, 72 are maintained in the reset condition by virtue of the high output from NAND gate 70. However, when the flip-flop 36 is triggered in response to an activating signal, the reset signal is removed so that the sequencers may respond to clock pulses when such clock pulses are produced. The output of the clock is normally maintained high which disables all of the NAND gates 120 by virtue of the low signal at the output of inverter 113. After the automatic page seizes the telephone line as described above, and detector 59 detects a dial tone to ultimately drive the output of NAND gate 76 high, the clock is enabled for oscillation. Initially, the output of the clock switches low, driving the output of inverter 113 high to provide an enabling signal to all of the NAND gates 120, and satisfying NAND gate 121 by virtue of the fact that the zero level output of the sequencer 71 is high, thereby driving the output of NAND gate 121 low. As will be described in more detail below, the output of NAND gate 121 is connected via one of the isolating diodes collectively indicated at 123 to decoding circuitry to cause the production of the tones of the first digit of the pre-programmed telephone number. When the clock again switches high, the output of inverter 113 switches low, disabling all of the NAND gates. The sequencers, however, clock on the rising edge, thereby enabling the next output of the sequencer 71, that is one level, so that when the clock again falls, the NAND gate 122 will be satisfied to cause the dialing of the second pre-programmed digit of the telephone number. Sequencing continues in this manner, with the inverter 113 providing inter-digit spacing, until the nine level of the sequencer 71 is reached, at which time the high output thereof will disable the sequencer 71, and acting through inverter 130 will enable the previously disabled sequencer 72. Sequencing continues as before, and when the rising edge of the clock causes the sequencer 72 to cycle to the three level, the rising output thereof, being coupled to the clock input of the dialing delay flip-flop 73 will cause that flip-flop to switch its Q output high and $\overline{Q}$ output low. At this point, the sequencing circuit has sequentially energized 11 of the NAND gates 120, allowing the dialing of a maximum of 11 digits, for example, a single digit access code, a three digit area code, and a seven digit telephone number.

The low $\overline{Q}$ output of the flip-flop 73 being connected to one of the inputs of the NAND gate 86 drives the output thereof high and satisfies NAND gate 76 to forward bias diode 111, disabling the clock 110 to halt sequencing. The low $\overline{Q}$ output disables the multivibrator 59 and also removes the reset signal from the flip-flop 99, allowing it to respond to a subsequent clock pulse. Finally, the high Q output of flip-flop 73 removes the reset from ultivibrator 60, activating that portion of the status signal sensing circuit 58 to detect a responsive signal from the central system. The automatic page is thus put into a waiting mode, requiring some response from the central system before the dialing cycle will be resumed. As described above, this response, in the form of a beep tone or the cesation of ring back signal, is detected by circuitry including multivibrator 60 and counter 61 operating in conjunction with transistor 96 and its associated timing circuit, to ultimately provide a clock signal to flip-flop 99 when the central system is prepared to receive the pager digits. The flip-flop 99 responds to this clock signal by driving its $\overline{Q}$ output low which, in turn, drives the output of NAND gate 76 high to reverse bias the diode 111 and re-enable the clock 61. As before, the output of astable multivibrator 110 will switch low and act through inverter 113 to enable the NAND gates 120, and specifically to drive the output of NAND gate 124, coupled to the active output of sequencer 72 (the three level where sequencing was temporarily halted) to its low condition, causing the production of the tones associated with the first digit of the pre-programmed pager number. Sequencing continues as before, sequentially dialing the pre-programmed digits of the pager number, until level 9 of sequencer 72 is reached. When level 9 switches high, the output of inverter 132 is driven low, driving the output of NAND gate 133 high, and providing a reset signal to the initiating flip-flop 36. The flip-flop 36 will respond by driving its Q output low, reverse biasing the diode 41 and allowing the capacitor 43 to discharge through resistor 44. The time delay associated with these elements is established at about 15 seconds, causing the page to remain on the line for a brief period following dialing of the pager number. In certain systems, a continued hold on the part of the system dialing the paging computer is necessary before the paging computer will respond and generate the necessary paging signals. When the timer comprising capacitor 43 and resistor 44 times out, the output of NAND gate 42 will switch high, switching the output of inverter 46 low, and removing base drive from the transistor 48. The relay 49 thus drops out, opening the contacts 49a to release the previously seized line. A complete calling cycle has thus been accomplished, including sensing of an incoming call, seizing of a line, detecting dial tone, dialing the telephone number of a distant station, detecting a responsive signal from the distant station, and dialing the pre-programmed pager number before releasing the line.

Referring briefly to FIG. 2, there is shown in detail one form of encoding matrix 63 interposable between the outputs of the sequencing circuit and the inputs of tone generator 64. The input terminals of the encoder, generally indicated at 140, comprise lines 1–9 and 0. The outputs, generally indicated at 141, comprise R1–R4 (row 1 through row 4) and C1–C3 (column 1 through column 3). The row and column outputs are connected to associated inputs on the tone generator 64 also as to cause the production of the two tones associated with any of the positions in the four row by three column matrix. For example, imposing a low signal on input terminal 4, serves to switch the row 2 and column 1 input lines low, to produce the tones associated with that position in the DTMF matrix.

Pre-programming of the telephone number and the pager number is accomplished by connecting the sequencer output terminals, collectively indicated at 125, to selected ones of the encoder input terminals 140. For example, if the first digit of the pre-programmed telephone number is 6, the phone number program terminal 1 in the array 125 is connected to input terminal 6 in the array 140 so that when NAND gate 121 is satisfied, the row 2 and the column 3 inputs of the tone generator 64 are activated to cause the production of the tones related to the digit 6. By virtue of the diodes 123 connected between the array of NAND gates 120 and the output terminals 125, isolation is achieved, allowing any number of the terminals 125 to be connected to the same input of the array 140 so that any sequence of numbers may be dialed. In addition, it is not necessary that each terminal 125 be used, it is only required that digits for accessing the central system be programmed in the proper sequency by connection to appropriate ones of the phone number program terminals, and that the digits of the pager similarly be programmed in the proper sequence by connection to appropriate ones of the pager number program terminals. Unused terminals may be left unconnected, or connected to a common point, if desired. It is seen that the output of the tone generator 64 is connected to the base of transistor 65 so that transistor 65 reproduces the tones generated by the tone generator 64 in response to numbers selected through the matrix 63 and drives winding 50c of the transformer 50 for imposing those tones on the line.

Realizing that the calling sequence is broken down into separate telephone number and pager number sub-cycles, and that such sub-cycles cannot be initiated in the absence of proper responses from the seized telephone line, means are provided for reinitiaing a calling cycle if such cycle is not successfully completed. In other words, the automatic page is configured so that a calling cycle is not terminated until the pre-programmed information is actually transferred to the distant location. To that end, a maximum perod timer generally indicated at 150 is provided, such timer being initiated by the start of a calling cycle, and setting a maximum period during which such calling cycle may be completed, falure to complete the cycle within the period serving to reset the circuitry to reinitiate the cycle. The timer 150 comprises an amplifier 151 arranged as a level detector and having a timing circuit connected to the input thereof comprising resistor 152 and capacitor 153. The timing circuit is connected via an appropriately poled diode 155 to the output of NAND gate 70. Recalling that the output of NAND gate 70 is at a high level whenever the automatic page is in the quiescent condition, it is seen that current will flow from the output of NAND gate 70 through resistor 154 and diode 155 to charge the capacitor 153. However, when an energizing signal is detected and the flip-flop 36 responds thereto by driving its Q output high, the output of NAND gate 70 will switch low, reverse biasing the diode 155 and allowing the capacitor 153 to begin to discharge through the resistor 152. The values of resistor 152 and capacitor 153 are selected so that the output of level detector amplifier 151, which is normally high, will switch low approximately 45 seconds after the diode 155 becomes reverse biased. If this occurs, that is if a calling cycle is not completed before the expiration of 45 seconds, the output of amplifier 151 switching low will cause the output of NAND gate 42 to switch high, driving the output of inverter 46 low, and switching transistor 48 off. The relay 49 will be deenergized to release the previously seized line. In addition, the output of NAND gate 70 will be switched high, resetting the sequencers 71, 72, the sequencing delay flip-flop 73, and driving the output of NOR gate 85 high. However, the condition of flip-flop 36 is not changed, the Q output thereof remaining high. By virtue of the fact that the output of NAND gate 70 has switched high, the capacitor 153 will again begin to charge through resistor 154. After the delay associated with these components, the output of amplifier 151 will again switch high, satisfying NAND gate 42, and reenergizing the transistor 48 to again seize the line. As when the call is first initiated, the dial tone detector 59 is active to sense dial tone on the seized line, and upon detection thereof enables the clock 61 to again begin sequencing from the beginning through the pre-programmed telephone number of the central system. The maximum calling cycle timer 150 is active at any point in the calling cycle, either before or after the sequencing circuit dials the number of the distant station. Thus, any occurrence which would abort the call, that is, prevent the call from going through serves to recycle the circuit to again initiate the call. For example, if dial tone is not detected, the circuit will wait the 45 seconds, drop the line, then re-seize the line to try again. Similarly, if the number of the distant station is dialed, but the distant station does not answer or otherwise respond, the timer 150 will time out to reinitiate the call. A busy signal imposed on the line after the central system is dialed will be incapable of actuating the responsive signal detector because the frequency thereof is below the period of the multivibrator 60. Again, the timer will time out to cause the page to place the call again. It is only when the entire calling sequences has been completed, including dialing of the number of the distant station and dialing of the pager number, that the last output of the sequencing circuit acts through inverter 132 to reset the flip-flop 36 to return the automatic page to its quiescent, call waiting condition.

The elements of the timer 150 described thus far serve to abort a calling cycle if such cycle measured from the initiation thereof, is not completed in a predetermined time. As an illustration of an alternative approach, FIG. 1b shows a resistor 156 and diode 157 coupling the output of NAND gate 76 to the capacitor 153 so that the timer is updated (the capacitor 153 recharged) while the sequencing circuitry is dialing the telephone number of the central system. In this case the timer sets a maximum period for each dialing sub-cycle, and aborts the call if one or the other of the sub-cycles is not completed during the alotted time.

In certain cases it is desirable to provide redundant calling to the central system, for example, in cases where the central system is in a high radio frequency interference area, or where the user often travels in the fringe areas of the system. To cover this contingency selector means are provided for initiating a second calling cycle after successful completion of a first cycle. A switch 160 connected to the set input of the flip-flop 36 has a single page position (1) in which the preset input of the flip-flop is coupled directly to ground. With the switch in the single page position, the set input is disabled so that upon successful completion of a first calling cycle, the flip-flop 36 is returned to its reset condition where it remains until detection of a new incoming call. However, with the switch in the repage position (2), the set input responds to repaging circuitry including flip-flop 161 and NOR gate 162. It is seen that the clock input of repage flip-flop 161 is driven by the Q output of the flip-flop 36 so that an activating leading edge is provided to the clock input when the flip-flop 36 is first clocked to its active state. Because the $\overline{Q}$ output of flip-flop 161 is connected to the D input thereof, the flip-flop 161 will respond to a clock pulse by toggling. The flip-flop 161 is normally maintained in the reset or $\overline{Q}$ high condition so that at the initiation of a cycle of the automatic page, the flip-flop responds by driving its Q output high and its $\overline{Q}$ output low. Thus, before the calling cycle was initiated, the output of NOR gate 162 was maintained at a low level by virtue of the high $\overline{Q}$ output of flip-flop 161. After the calling cycle is initiated, the output of NOR gate 162 is again maintained low by virtue of the high signal at the output of inverter 46. The low output signal forward biases diode 164 to maintain capacitor 165 in a relatively discharged condition. At the successful completion of a first dialing cycle, and with the switch 160 in the illustrated or repage position, resetting of the flip-flop 36 will remove the high signal from the input of NOR gate 162, allowing the output thereof to switch high. This allows the capacitor 165 to charge through resistors 166 and 167. When the voltage level on capacitor 165 exceeds the switching threshold of the flip-flop 36, the set input will be activated, switching the Q output high, and initiating a repage cycle, just as if the flip-flop 36 had responded to a clock signal from the sensing circuit. The repage cycle is identical to the initial cycle except that when the Q output of the flip-flop 36 is driven high to initiate that cycle, it again clocks the flip-flop 161, returning the $\overline{Q}$ output thereof to a high level. This high level maintains the output of NOR gate 162 low, keeping the capacitor 165 discharged so that at the termination of the repage cycle, the capacitor 165 is incapable of recharging to initiate a further cycle.

It is emphasized that the repage cycle, just as the initial paging cycle, responds to signals on the line as sensed by the automatic page and, if the cycle is not properly completed the automatic page will reinitiate the second cycle. Thus, when using the page in the repage mode, the user is assured of two complete calling cycles to the central paging system.

As further features of the illustrated embodiment, it is seen that a power on indicator is provided, comprising amplifier 170 driven by the output of astable amplifier 110, and having an indicator in the form of LED 171 coupled to the output thereof. Using this arrangement, the biasing circuit for the LED including resistor 172 may be arranged so that the LED is illuminated whenever power is applied to the circuit, but is dimmed or extinguished whenever the clock 61 is sequencing the dialing circuitry.

To assure that the circuit is turned on in a controlled condition, a power on reset circuit including resistor 180 and capacitor 181 is provided. The junction between the resistor 180 and capacitor 181 is coupled to one of the inputs of NAND gate 133 so that the output thereof is maintained high for a brief period following application of power, such high input serving to reset the flip-flop 36. In addition, the junction between the resistor and capacitor is connected to inverter 184 the output of which resets the repage flip-flop 161 upon the application of power. To prevent the line from being seized after a calling cycle is intentionally terminated by turning the power off, then back on, a contact 185 of the power switch shunts a low value resistor 186 across the capacitor 43, such contact being closed when the power switch is operated to the off position to rapidly discharge the capacitor.

While the paging system described in detail above lends itself admirably to telephone line sensing, it is also capable of other uses, such as paging a technician or the like in the event of an alarm condition at an equipment location. In this application, the line sensing circuit 20 is not utilized, but the circuitry responsive thereto is used to monitor the output of an alarm system. The alarm system is of the type providing a normally closed contact to ground, such contact being connected to a resistor 186 which, in turn, is connected to the timing capacitor 33. Because the contact is normally closed and is connected to ground, the capacitor 33 is normally maintained in a discharged condition, keeping the output of level detector amplifier 35 low, and thus arming the flip-flop 36. If an alarm condition is detected, the alarm circuitry responds by opening the contact, allowing the capacitor 33 to charge through the resistor 31 and diode 32, switching the output of amplifier 35 high to clock the flip-flop 36 and initiate a calling cycle. Just as in the answering machine application, the automatic page seizes the line, detects conditions thereon, and causes the dialing of the phone number of a distant station, detects a responsive signal, then dials the digits of the assigned pager number, and does so in a failsafe manner to assure that the call goes through. The central station then generates a radio paging signal which alerts the user that an alarm condition is in effect at the equipment location.

It will now be apparent that what has been provided is a failsafe automatic page, having a plurality of applications, and being adapted to seize a telephone line, dial a central paging system, and communicate pre-programmed pager digits to the central system, all done in such a manner that the call is assured of going through before the page returns to its quiescent condition.

I claim as my invention:

1. An automatic dialer for use with an automatic telephone answering machine and a central paging system, wherein the answering machine is connected to a telephone line for automatically answering calls and recording messages and the central system is of the type accessible by dialing a telephone number assigned thereto, the central system after answering a call placed thereto being adapted to accept dialed digits corresponding to the number assigned to a pager and to respond thereto by signaling that pager, said automatic dialer comprising in combination, means coupled to said telephone line for detecting the busy/idle status of the answering machine and producing an activating signal in response to a message left with said answering machine, calling cycle means responsive to said activating signal for performing a calling cycle comprising.

means for seizing a telephone line, means for detecting dial tone on said seized line, programmed telephone number dialing means initiated by said dial tone detecting means for dialing the number of said central system, means for sensing a responsive signal on said seized line indicating that the central system has answered, programmed pager number dialing means initiated by said responsive signal sensing means for dialing the number of said pager thereby to instruct the central system to signal the associated pager, and means for resetting said calling cycle means after completion of a calling cycle, and reinitiating means for releasing said seized line and reinitiating a calling cycle if said calling cycle is aborted.

2. An automatic dialer for use with an automatic telephone answering machine and a central paging system, wherein the answering machine is connected to a telephone line for automatically answering calls and recording messages and the central system is of the type accessible by dialing a telephone number assigned thereto, the central system after answering a call placed thereto being adapted to accept dialed digits corresponding to the number assigned to a pager and to respond thereto by signaling that pager, said automatic dialer comprising in combination, means coupled to said telephone line for detecting the busy/idle status of the answering machine and producing an activating signal in response to a message left with said answering machine, calling cycle means responsive to said activating signal for performing a calling cycle comprising, means for seizing a telephone line, dialing means programmed with the telephone number of said central system and the number of an associated pager, means for sequencing the dialing means for dialing the programmed numbers, means for detecting dial tone on said seized line and in response thereto enabling said sequencing means to dial the programmed number of said central system, means for detecting a responsive signal on said seized line indicating that said central system has answered and in response thereto enabling said sequencing means to dial the programmed number of said pager, and resetting means for resetting said calling cycle means after completion of a calling cycle, and reinitiating means for releasing said seized line and reinitiating a calling cycle if said calling cycle is aborted.

3. The automatic dialer as set forth in claim 2 wherein the means for detecting the busy/idle status of the answering machine comprises means responsive to the level of direct current flow to said answering machine and having a first state when said answering machine is idle and a second state when said answering machine is busy.

4. The automatic dialer as set forth in claim 3 wherein said means detecting the busy/idle status of the answering machine comprises photo-emissive means interposed between said telephone line and said answering machine so that said photo-emissive means is illuminated when said answering machine is busy, photo-responsive means optically coupled to said photo-emissive means, and means coupled to said photo-responsive means for producing an output signal indicative of the status of said answering machine.

5. The automatic dialer as set forth in claim 2 wherein the means detecting the busy/idle status of the answering machine comprises photo-emissive means responsive to the level of direct current flow between the telephone line and the answering machine, and photo-responsive means optically coupled to said photo-emissive means for producing an output signal indicative of the status of said answering machine.

6. The automatic dialer as set forth in claim 5 including circuit means coupled to said photo-responsive means and armed by an output signal thereof indicating said answering machine is busy, said circuit means being responsive to an output signal indicating a return to the idle condition of said answering machine for producing said activating signal.

7. The automatic dialer as set forth in claim 2 wherein the dial tone detecting means and the responsive signal detecting means comprise means responsive to signals on the seized line for producing a binary clock signal, and digital frequency detectors responsive to the binary clock signal for producing output signals indicating the presence or absence of the respective signals.

8. The automatic dialer as set forth in claim 7 wherein the dial tone detecting means comprises a retriggerable multivibrator having a clock input driven by said binary clock signal, said multivibrator having a period below the period of the dial tone signal so that said multivibrator will remain triggered when dial tone is on the seized line, and timing means coupled to the output of said multivibrator and actuated by the detection of a continuous dial tone for enabling said sequencing means to dial the programmed number of said central system.

9. The automatic dialer as set forth in claim 2 wherein the responsive signal is a beep tone, the responsive signal detecting means comprising means responsive to signals on the seized line for producing a binary clock signal, a digital frequency detector responsive to the frequency of said beep tone, means coupling the binary clock signal to said digital frequency detector, said digital frequency detector including means for producing a binary output signal when said beep tone is continuous for a predetermined number of cycles, and means responsive to said binary output signal for enabling said sequencing means to dial the programmed number of said pager.

10. The automatic dialer as set forth in claim 2 wherein the responsive signal detecting means comprises means responsive to signals on the seized line for producing a binary clock signal, a digital frequency detector responsive to the frequency of ring back signal, means for coupling the binary clock signal to said digital frequency detector, said digital frequency detector including means for producing a binary output signal indicating the presence or absence of said ring back signal on the seized line, and means responsive to said binary output signal armed by the presence of said back signal and actuated by the cessation of ring back signal when said central system answers.

11. The automatic dialer as set forth in claim 2 wherein the responsive signal detecting means comprises means responsive to signals on the seized line for producing a binary clock signal, a digital frequency detector responsive to the frequency of ring back signal, means coupling said binary clock signal to said digital frequency detector, said digital frequency detector including means for producing a binary signal indicating the presence or absence of said ring back signal on the seized line, timing means responsive to said binary signal armed by the presence of ring back signal and having a period sufficient to span dwell periods separating ring back tones, and means coupled to said timing means and sensitive to the timing out thereof for sensing the cessation of said ring back signal indicating said central system has answered.

12. The automatic dialer as set forth in claim 2 wherein the responsive signal detecting means comprises means sensing the frequency of signals on the line to produce a clock signal, a retriggerable multivibrator responsive to said clock signal, the period of said retriggerable multivibrator being set at about the minimum frequency to be detected, a counter responsive to said clock signal for producing an output signal after counting a predetermined number of cycles of said clock signal, the output of said multivibrator being coupled to said counter for restarting said count when the clock signal has a period greater than the period of said multivibrator, the output signal of said counter being coupled to said sequencing means for enabling same to dial the programmed number of said pager.

13. The automatic dialer as set forth in claim 12 wherein said means producing a clock signal comprises a zero crossing detector responsive to signals on said seized telephone line.

14. The automatic dialer as set forth in claim 2 wherein the reinitiating means comprises a maximum cycle timer for establishing a maximum period for completion of said calling cycle, and means responsive to said timer timing out before completion of a calling cycle for releasing said seized line and reinitiating a calling cycle.

15. The automatic dialer as set forth in claim 2 further including re-page means for demanding an additional calling cycle, said re-page means being responsive to said resetting means for initiating a second calling cycle upon completion of a first calling cycle.

16. The automatic dialer as set forth in claim 2 further including a tone generator, means coupling the output of said generator to the seized telephone line, and decoding means coupling said dialing means to said tone generator for generating signals corresponding to the digits of said telephone number and pager number.

17. The automatic dialer as set forth in claim 2 further including dialing delay means responsive to the completion of dialing of the number of said central system for inhibiting said sequencing means, and means coupling said responsive signal detecting means to the dialing delay means for re-enabling said sequencing means to dial the programmed number of said pager.

18. An automatic dialer for use with an automatic telephone answering machine and a central paging system, wherein the answering machine is connected to a telephone line for automatically answering calls and recording messages and the central system is of the type accessible by dialing a telephone number assigned thereto, the central system after answering a call placed thereto being adapted to accept dialed digits corresponding to the number assigned to a pager and to respond thereto by signaling that pager, said automatic dialer comprising in combination, means coupled to said telephone line for detecting the busy/idle status of the answering machine, means for timing the busy period of said machine and producing an activating signal if a busy period exceeds a predetermined threshold, calling cycle means responsive to said activating signal for performing a calling cycle comprising, means for seizing a telephone line, means responsive to the frequencies of signals on said seized telephone line for producing a clock signal, dial tone detecting means responsive to said clock signal for detecting a dial tone, programmed dialing means initiated by said dial tone detecting means for dialing the number of said paging system, responsive signal detecting means responsive to said clock signal for detecting a responsive signal from the central system indicating the central system has answered, programmed pager number dialing means initiated by the responsive signal detecting means for dialing the programmed pager number, and means for resetting said calling cycle means upon completion of a calling cycle, and reinitiating means for releasing said seized line and reinitiating a calling cycle if said calling cycle is not completed within a predetermined period.

19. The automatic dialer as set forth in claim 18 wherein the means for detecting the busy/idle status of the answering machine comprises means responsive to the level of direct current flow to said answering machine and having a first state when said answering machine is idle and a second state when said answering machine is busy.

20. The automatic dialer as set forth in claim 19 wherein said means detecting the busy/idle status of the answering machine comprises photo-emissive means interposed between said telephone line and said answering machine so that said photo-emissive means is illuminated when said answering machine is busy, photo-responsive means optically coupled to said photo-emissive means, and means coupling said photo-responsive means to said busy period timing means.

21. The automatic dialer as set forth in claim 20 wherein said seizing means comprises a flip-flop armed by said timing means when a busy period of said answering machine exceeds said predetermined threshold, said flip-flop being coupled to said timing means for triggering thereby upon the return of said answering machine to the idle condition.

22. The automatic dialer as set forth in claim 18 wherein the means detecting the busy/idle status of the answering machine comprises photo-emissive means responsive to the level of direct current flow between the telephone line and answering machine, and photo-responsive mekans optically coupled to said photo-emissive means for producing an output signal indicative of the status of said answering machine, said photo-responsive means being coupled to said busy period timing means.

23. The automatic dialer as set forth in claim 22 wherein said seizing means comprises bistable means armed by said timing means when a busy period of said answering machine exceeds said predetermined threshold, said bistable means being adapted to respond to the return of said answering machine to the idle condition for producing said activating signal.

24. In an automatic dialer for dialing a programmed telephone number for accessing a central paging system and a sequence of programmed pager digits for communication to said central system after accessing same, said page adapted to be activated by a predetermined signal, the combination comprising, calling cycle means responsive to said predetermined signal for performing a calling cycle, means activated during said calling cycle for seizing a telephone line, means for sensing the frequencies of the signals on said seized line, dial tone detecting means responsive to said sensing means for detecting a dial tone signal on said seized line, telephone number dialing means initiated by the dial tone sensing means for dialing the programmed telephone number of said central system, responsive signal detecting means coupled to said sensing means for detecting a responsive signal from the central system indicating access thereto, pager number dialing means initiated by said responsive signal detecting means for dialing the programmed pager digits, resetting means for returning said calling cycle means to an idle condition after completion of a calling cycle, and reinitiating means for releasing said seized line and reinitiating a calling cycle in the event said calling cycle is not completed within a predetermined period.

25. The automatic dialer as set forth in claim 24 wherein the means for sensing the frequencies of signals on the seized line includes means for producing a binary clock signal, the dial tone detecting means and the responsive signal detecting means comprising digital frequency detectors responsive to the binary clock signal, said digital frequency detectors including means for producing output signals indicating the presence or absence of the respective signals.

26. The automatic dialer as set forth in claim 25 wherein the dial tone detecting means comprises a retriggerable multivibrator having a clock input driven by said clock signal, said multivibrator having a period below the period of the dial tone signal so that said multivibrator will remain triggered when dial tone is on the seized line, and timing means coupled to the output of said multivibrator and actuated by the detection of a continuous dial tone for initiating said telephone number dialing means to dial the programmed number of said central paging system.

27. The automatic dialer as set forth in claim 24 wherein the responsive signal is a beep tone, the means for sensing the frequencies of signals on the seized line including means for producing a binary clock signal, the responsive signal detecting means comprising a digital frequency detector responsive to the frequency of said beep tone, means coupling the binary clock signal to said digital frequency detector, said digital frequency detector including means for producing a binary output signal when said beep tone is continuous for a predetermined number of cycles, and means responsive to said binary output signal for initiating said pager number dialing means to dial the programmed pager digits.

28. The automatic dialer as set forth in claim 24 wherein the means for sensing the frequencies of signals on the seized line includes means for producing a binary clock signal, the responsive signal detecting means comprising a digital frequency detector responsive to the frequency of ring back signal, means coupling the binary clock signal to said digital frequency detector, said digital frequency detector including means for producing a binary signal indicating the presence or absence of said ring back signal, timing means responsive to said binary signal armed by the presence of ring back signal and having a period sufficient to span dwell periods separating ring back tones, and means coupled to said timing means and sensitive to the timing out thereof for sensing the cessation of said ring back signal indicating said central system has answered.

29. The automatic dialer as set forth in claim 24 wherein the responsive signal detecting means comprises means sensing the frequency of signals on the line to produce a clock signal, a retriggerable multivibrator responsive to said clock signal, the period of said retriggerable multivibrator being set at about the minumum frequency to be detected, a counter responsive to said clock signal for producing an output signal after counting a predetermined number of cycles of said clock signal, the output of said multivibrator being coupled to said counter for restarting said count when the clock signal has a period greater than the period of said multivibrator, and means responsive to the output signal of said counter for initiating said information number dialing means to dial the programmed information bearing numbers.

30. The automatic dialer as set forth in claim 29 wherein said means producing a clock signal comprises a zero crossing detector responsive to signals on said seized telephone line.

31. The automatic dialer as set forth in claim 24 wherein the reinitiating means comprises a maximum cycle timer for establishing a maximum period for completion of said calling cycle, and means responsive to said timer timing out before completion of a calling cycle for releasing said seized line and reinitiating a calling cycle.

32. The automatic dialer as set forth in claim 24 further including re-page means for demanding an additional calling cycle, said re-page means being responsive to said resetting means for initiating a second calling cycle upon completion of a first calling cycle.

33. The automatic dialer as set forth in claim 24 further including a tone generator, means coupling the output of said generator to the seized telephone line, and decoding means coupling said telephone number and pager number dialing means to said tone generator for generating signals corresponding to the digits of said telephone number and page number.

34. In an automatic dialing system for connection with a telephone line and having means responsive to an activating signal for seizing said telephone line, and sequencing means for dialing a pre-programmed telephone number, the improvement comprising means responsive to signals on the seized line for producing a binary clock signal, a digital frequency detector responsive to said binary clock signal for producing a binary output signal having respective levels indicating the presence or absence of dial tone on said seized line, and means responsive to said level indicating the presence of dial tone for enabling said sequencing means to dial the pre-programmed telephone number.

35. The improvement as set forth in claim 34 wherein said means for producing a binary clock signal comprises a zero crossing detector, and means coupling the input of said zero crossing detector to said seized line.

36. The improvement as set forth in claim 35 wherein said digital frequency detector comprised a retriggerable multivibrator having a clock input coupled to the output of said zero crossing detector, said multivibrator having a period below the period of the dial tone signal so that said multivibrator will remain triggered when dial tone is on the seized line, said means responsive to said binary output signal including timing means coupled to the output of said multivibrator and actuated by the detection of a continuous dial tone for enabling said sequencing means to dial the pre-programmed telephone number.

37. The improvement as set forth in claim 34 wherein the digital frequency detector comprises a retriggerable multivibrator having a clock input for receiving said binary clock signal, said multivibrator having a period below the period of the dial tone signal so that said multivibrator will remain triggered when dial tone is on the seized line, said means responsive to said binary output signal including timing means coupled to the output of said multivibrator and actuated by the detection of a continuous dial tone for enabling of said sequencing means to dial the pre-programmed telephone number.

38. In an automatic dialer for use with an automatic telephone answering machine and a central paging system, wherein the answering machine is connected to a telephone line for automatically answering calls and recording messages, and the central system is of the type accessible by dialing a telephone number assigned thereto, the central system after answering a call placed thereto being adapted to accept dialed digits corresponding to the number assigned to a paper and to respond thereto by signalling that pager, said automatic dialer including means responsive to an activating signal for seizing a telephone line and dialing the telephone number of said central system for accessing same and thereafter for dialing the digits corresponding to said pager, the improvement in said automatic dialer comprising photo-emissive means interposed between said telephone line and said answering machine for sensing the busy or idle condition of said answering machine, said photo-emissive means being connected to respond to the level of direct current flow between said telephone line and said answering machine to assume a first condition when said answering machine is idle and a second condition when said answering machine is busy, photo-responsive means optically coupled to said photo-emissive means for producing an output signal having first and second states indicative of the respective first and second conditions of said photo-emissive means, and means coupled to said photo-responsive means for generating said activating signal when a message is left with said answering machine, whereby said automatic dialer senses left messages without the need for internal connections to said answering machine.

39. The improvement as set forth in claim 38 wherein said means coupled to said photo-responsive means includes circuit means armed by an output signal of said second state, said circuit means being responsive to said output signal returning to said first state to generate said activating signal.

40. The improvement as set forth in claim 39 wherein said means connected to said photo-responsive means includes timer means responsive to said output signal for arming said circuit means, said timer means having a period for delaying said arming until said output signal has remained in said second state for the period of said timer means.

* * * * *